July 6, 1937. F. L. SESSIONS 2,086,306
SPEED CONTROL FOR PROGRESSIVE ELECTRIC HEATING AND WELDING
Filed Sept. 22, 1932 2 Sheets-Sheet 1

INVENTOR:
Frank L. Sessions

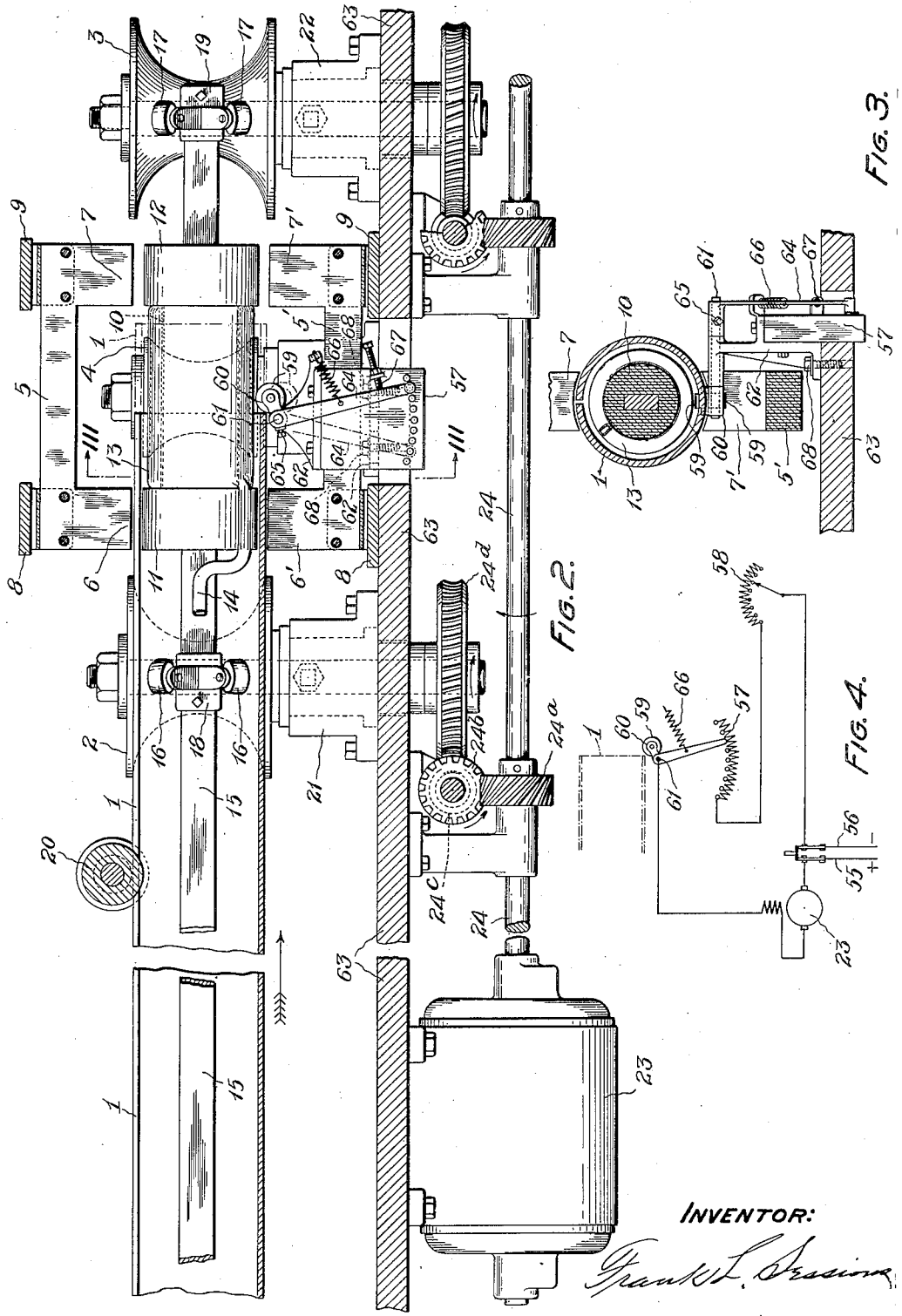

Patented July 6, 1937

2,086,306

UNITED STATES PATENT OFFICE 2,086,306

SPEED CONTROL FOR PROGRESSIVE ELECTRIC HEATING AND WELDING

Frank L. Sessions, Lakewood, Ohio

Application September 22, 1932, Serial No. 634,396

14 Claims. (Cl. 219—6)

My invention relates to progressive electric heating or welding wherein the travelling work, which is to be heated or welded, is caused to move at suitably reduced speeds when a predetermined portion, such as an end, of the work is passing through the heating or welding zone. It is particularly applicable to the progressive electric heating or welding of metallic, tubular articles, such as tubes, pipes, metal cylinders or shells, and also plates or sheets, by the electric induction method. I have shown and described my invention as applied to the progressive electric induction welding of a longitudinal seam in a metal tube or pipe.

When a tube is being welded by the electric induction method, the heating effect near the ends of the tube entering and leaving the welding zone is reduced. This is particularly true of the trailing end of the tube. I am aware that other ways of overcoming this difficulty have been proposed. My invention is adapted to be used either in combination with, or independently of, these other ways to assist in improving the heating or welding effect at and near an end, or ends, of the tube, and promoting uniform heating and welding nearer to the ends of the tube.

Among the objects of my invention are:

Increasing the time of heat application to certain portions of the metal such, for instance, as those at the ends of a tube to compensate either entirely, or partially, for the reduced heating effect or rate of heating which may occur in those portions while they are passing through the heating or welding zone.

The provision of a method of and apparatus for controlling the speed of movement of the work responsive to the movement of the work past a predetermined point.

Feeding the work into the heating or welding zone at a suitably reduced speed and accelerating the rate of feeding substantially in proportion to the improved heating or welding effect as the work progresses through the heating or welding zone.

Decreasing the normal speed of movement of the work substantially in proportion to the decreased heating or welding effect as the trailing end of the work passes through the heating or welding zone.

The provision of means for automatically causing the work to move at slower and faster speeds at predetermined times, depending upon the movement of the ends of the work relative to the heating or welding zone.

The provision of means for decreasing the speed of the work when the ends of the work are passing through the heating or welding zone whereby the increased time of heat application either wholly or partially compensates for the decrease in the rate of heat application to increase the total heat applied to the ends of the work above that which would be normally applied if the speed was not so decreased.

The provision of means actuated by movement of the work to control the speed of movement of the work.

The provision of means responsive to the movement of the work, and adapted to change the speed of movement of the work with a suitable acceleration or retardation.

The provision of means whereby the acceleration and/or retardation of the speed of the work may be independently adjusted to suit the required conditions.

These and other objects which will be apparent from the specification and drawings, are accomplished by the use of my invention.

The drawings are more or less diagrammatic and many of the parts are shown conventionally in order clearly to illustrate the principles of my invention.

In the drawings:

Fig. 2 is a side elevation partly in section of a modified form of my invention.

Fig. 3 is a vertical cross section taken in the plane indicated by the line III—III in Fig. 2.

Fig. 4 is a wiring diagram for the modified form shown in Fig. 2.

Figure 1:
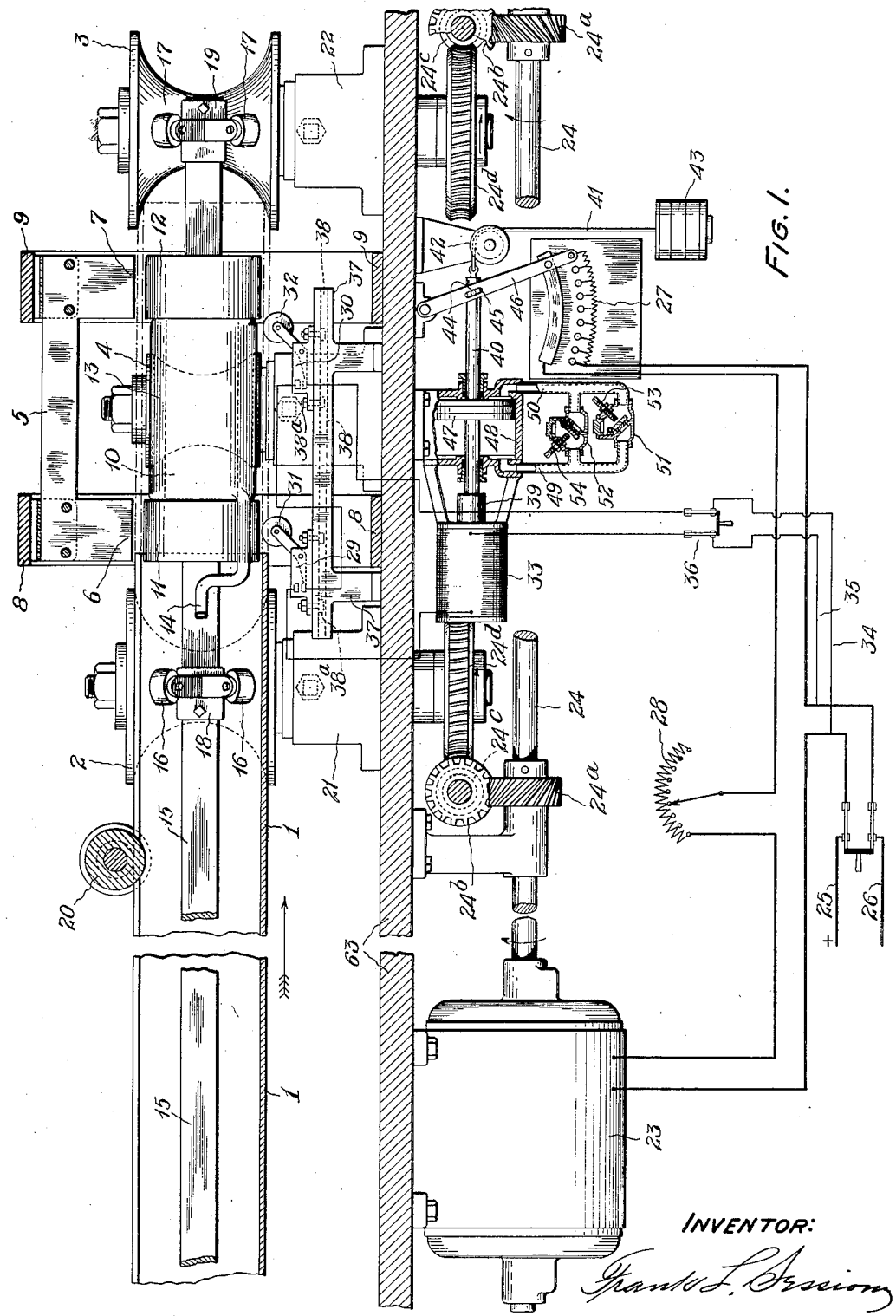
Fig. 1 is a side elevation partly in section of one form of my invention.

In Fig. 1, a tube 1 is shown as being progressively traversed from left to right. The tube is fed by means of two sets of driven rolls 2 and 3, the rolls 2 feeding the work to the welder while the rolls 3 are take-off rolls. It will be understood that the form, position and number of the work-feeding rolls may be varied as necessary or desired. The rolls 3 also serve to exert final welding pressure, or take-up, on the tube. Suitable idler rolls 4 may be provided between the pairs of rolls 2 and 3. These rolls 4 serve to assist in pressing the seam edges together, or in holding the seam edges in the desired relation to each other as the tube is passing through the heating zone.

The induction unit for producing the magnetic field which links the tube to induce the heating and welding currents in the metal of the tube is shown diagrammatically. An external magnetic core 5 has a longitudinally-extending yoke, or center section, and longitudinally-spaced poles 6 and 7 which terminate closely adjacent the outside surface of the tube. The magnetic core 5 is supported by suitable members 8 and 9, and is preferably suitably insulated from these members. I have shown only one external core 5 and its poles 6 and 7 in Fig. 1, although, as is well known in the art, a plurality of such cores and poles may be suitably positioned around the outer circumference of the tube. An internal magnetic core is provided with a longitudinally-extending center section 10 and poles 11 and 12. The poles 11 and 12 are positioned to terminate closely adjacent the inside surface of the tube opposite the poles 6 and 7, respectively, of the external magnetic core. Surrounding the center section 10 of the internal magnetic core is an induction coil 13. This induction coil 13 is suitably insulated from the magnetic core and from the tube. It may be constructed in any desired manner. Alternating current, or its equivalent, is supplied to the coil 13 through terminals 14, only one of which is shown. The coil may be a single series of turns or it may be made up of a plurality of sections.

The internal magnetic core is shown supported on a member 15, which may be of any suitable construction. This member 15 may be anchored by means of a plate adapted to extend through the open seam of the advancing unwelded tube at the entering end of the apparatus in known manner. The plate may be suitably supported by external supporting means, also in known manner. The plate and the external supporting means are not shown in the drawings, as such means are well known in the art.

Further supporting means for the internal induction unit is provided in the form of the rolls 16 and the rolls 17. Preferably pluralities of these rolls are supported by brackets 18 and 19 respectively, which are attached to the member 15 at respectively opposite ends of the internal induction unit. The groups of rolls 16 and 17 are adapted to engage the inside surface of the tube.

The external and internal magnetic cores are supported so that a substantially constant air gap is maintained between the poles 6 and 11 and the poles 7 and 12. These air gaps are sufficient to permit the ready passage of the metal of the tube through them.

A seam-guiding or seam-spreading roll 20 is preferably provided at the tube entering end of the apparatus.

The sets of work-feeding rolls 2 and 3 are supported by suitable brackets 21 and 22 respectively, so that the rolls of each pair may be adjusted towards and away from each other transversely of the axis of the tube, and rolls 4 are supported in similar brackets. An electric motor 23 drives rolls 2 and 3 through a shaft 24. The roll shafts are connected to the driving shaft 24 by means of suitable gears such as the helical gears 24—a and 24—b and worm 24—c and worm wheel 24—d.

The power is supplied to the motor through wires 25 and 26 and suitable rheostats 27 and 28. The rheostats 27 and 28 are adjustable to provide means for varying and controlling the speed of the motor 23 to vary and control the speed of rotation of the work-feeding rolls 2 and 3 and thus the speed of the work. They may be placed in any suitable part of the motor circuits depending on the type of motor used, as is well known. The rheostat 28 is manually adjustable. The rheostat 27 is automatically controlled to control and vary the speed of the tube at predetermined times when different portions of the length of the tube are approaching and passing through the heating or welding zone.

The apparatus for controlling the rheostat 27 consists of two normally-open limit switches 29 and 30. These limit switches are of any well known form and are provided with rollers 31 and 32, respectively, which normally extend into the path of movement of the wall of the tube, 10 as shown in Fig. 1. The two limit switches 29 and 30 are connected in series with a solenoid 33. Power is supplied to this circuit through the wires 34 and 35 and the switch 36. The limit switches 29 and 30 are mounted for longitudinal adjustment on a suitable bracket 37. The bracket 37 is provided with longitudinally extending T-slots 38 to receive bolts 38—a to permit adjustment of the limit switches in well known manner.

A moving member 39 of the solenoid 33 is connected to one end of a bar 40. The opposite end of the bar 40 is connected to a cable 41 which runs over a suitably supported pulley 42 and is connected to a counterweight 43. A pin 44 on the bar 40 passes through a suitable slot 45 in the rheostat arm 46. Movement of the bar 40 will cause movement of the rheostat arm 46.

Intermediate the ends of the bar 40, a piston 47 is fixedly secured to it. This piston operates in the fluid cylinder, or dash-pot, 48. The opposite ends of the dash-pot 48 are connected to each other through the pipes 49 and 50 and two one-way check valves 51 and 52. The valve 51 permits passage of fluid in one direction only and the valve 52 permits passage of fluid only in the opposite direction. The valves 51 and 52 are provided with adjusting screws 53 and 54, respectively, which permit and make possible independent adjustment of the opening of each of the valves. This makes it possible to independently control the time required for movement of the piston 47 and the rheostat arm 46 in each direction. The counter-weight 43 may also be adjusted to meet required conditions. As shown in Fig. 1, the solenoid moves the bar 40 to the left when it is energized. When the solenoid is not energized, the counter-weight 43 moves the bar 40 and associated parts, including the rheostat arm 46, to the right.

In the operation of the form of my invention shown in Fig. 1, when no tube is present in the machine, the solenoid 33 is not energized because both of the limit switches 29 and 30 are in their normally open position, as they are shown in Fig. 1. The counterweight 43 holds the arm 46 of rheostat 27 in the position shown so that the resistance is in the motor circuit to cause the motor, when energized, to run at a slow speed. The rolls 2 and 3 will consequently be driven at a correspondingly slow speed. A tube now moved into the apparatus will be fed forward at this slow speed. When the entering end of the moving tube strikes the roller 31 of the limit switch 29 it closes it. Limit switch 30 remains open until the entering end of the tube strikes the roller 32, at which time both limit switches are closed and the solenoid 33 is energized. This causes the rheostat arm 46 to move to the left and cut out the resistance in the motor circuit, the time required for cutting out the resistance being determined by the setting of the valve 51. The speed of the tube-feeding means is thus accelerated until the normal speed at which it is desired to move the main body of the tube, is reached. The period of acceleration is governed by the adjustment of the screw 53 of the valve 51, and also by the ratio of the pull of the solenoid 33 to the weight of the counterweight 43.

The tube continues to be fed at normal speed, unless it is otherwise desired to change this speed by the manual adjustment of the rheostat 28, until the trailing end of the tube passes the roller 31 of the limit switch 29. This switch then opens the circuit of the solenoid 33, although the limit switch 30 is still closed. The counterweight 43 then causes the rheostat arm 46 to swing to the right and throws the resistance of rheostat 27 into the motor circuit. This causes retardation of the speed of the motor, the tube-feeding means, and the tube. The time of such retardation may be independently controlled by means of the adjustment of the opening of the valve 52 by the screw 54. After the period or time of retardation is over, the tube-feeding means continues operating at a constant reduced speed. When the trailing end of the tube has passed off of both of the rollers 31 and 32, both of the limit switches are open and the cycle may be repeated with the next on-coming tube.

It will be seen that in this form the limit switch 30 is controlling as regards the effect on the speed of the entering end and the limit switch 29 is controlling as regards the effect on the speed of the trailing end.

The relative positions of the limit switches 29 and 30 may be adjusted at will to control the relative times at which retardation and acceleration of the work through the heating or welding zone are to occur. The periods of acceleration and retardation, i. e., the time required for movement of the rheostat from one end to the other, may be controlled and varied by the adjustment of the valves 51 and 52 to correspond with the periods in which the heating or welding effects are building up and decreasing, respectively. The limit switches 29 and 30 may be positioned so that the work will start to move faster when the heating or welding effect tends to increase, and to move slower when the heating or welding effect tends to decrease. The switches may be readily positioned so that, if desired, the entering end will move at normal speed and the only change in speed will occur when the trailing end is being heated or welded. This can be done by locking the switch 30 in its closed position, or by moving the switch 30 close to the entering end of the apparatus. Likewise the speed change at the trailing end may, if desired, be eliminated by locking the switch 29 in its closed position, or by moving it close to the exit end of the apparatus.

In the modified form of my invention shown in Figs. 2, 3, and 4, those parts of these figures which are the same as parts shown in Fig. 1 are marked with the same reference numerals.

In the form shown in Fig. 2, I have shown a second external magnetic core 5' with poles 6' and 7'.

As shown in the wiring diagram, Fig. 4, power is supplied to the motor 23 from wires 55 and 56 through rheostats 57 and 58. The rheostat 58 is manually adjustable. The rheostat 57 is moved automatically by the passage of an end of the tube over a roller 59. The roller 59 is mounted in a lever 60, which is fixedly secured to a shaft 61. The shaft 61 is rotatably supported in a bearing in the upper end of a bracket 62, which is adjustably mounted on the frame or bed-plate 63 of the machine. The rheostat arm 64 is also fixedly secured to the shaft 61 as by means of setscrew 65. The main body of the rheostat is supported by the bracket 62. A spring 66 is adapted to hold the rheostat normally in the position shown in Fig. 2. The extent of movement to the right of the rheostat arm 64 is limited by the adjustment of a screw 67. Screws 68 which fasten the bracket 62 to the frame 63 pass through slotted holes in the bracket 62 so that the position of the bracket 62 and the roller 59 may be suitably adjusted longitudinally of the machine.

In the operation of the modified form of my invention shown in Figs. 2, 3 and 4, the rheostat 57 is operated directly by the ends of the tube by mechanical means. The tube is fed into the machine at the desired reduced speed until the entering end of the tube strikes the roller 59. The entering end of the tube contacts with the roller 59 and causes it to swing downwardly out of the path of the tube. This swings the arm 64 of the rheostat 57 to the left and cuts its resistance out of the motor circuit to cause the motor to accelerate for a definite time and then continue at the normal speed at which it must run to provide the normal speed of travel for the main body portion of the tube. The normal speed is constant unless it is desired to vary it by means of the manually operated rheostat 58. Control of the rheostat 58 also may be used to vary the reduced speed at which the tube moves when the resistance of the rheostat 57 is in the circuit. This reduced speed may also be determined by adjustment of the screw 67 to vary the amount of resistance thrown into the circuit by the rheostat 57.

When the trailing end of the tube passes off the roller 59, the spring 66 moves the rheostat arm 64 to the right to throw the resistance of the rheostat 57 again into the motor circuit and the speed of the motor is retarded and brought to the desired reduced speed.

By moving the bracket 62 to the left towards the front or entering end of the machine, the entering end of the tube will be caused to speed up to normal speed sooner, and the trailing end will be caused to move at reduced speed for a longer period of time as it is passing through the zone of heat application. The opposite results may be accomplished by moving the bracket 62 to the right towards the finishing or rear end of the machine.

While I have shown and described apparatus which is designed for the progressive electric induction welding of longitudinal seams in tubes in which the speed of travel of the tube is retarded or accelerated as the trailing or leading end portion of the tube moves through the heating zone, it will be apparent to those skilled in the art, that by suitably positioning the actuating devices, the speed of travel of the tube may be similarly controlled when any other portion of the length of the tube moves through the heating zone.

While I have illustrated and described two possible forms of speed control apparatus for carrying out my invention, it will be understood by those skilled in the art that other forms may be used, and various modifications may be made without departing from the spirit and scope of my invention, such as combinations of magnetic contactors, such as are commonly used for controlling the time of acceleration and retardation of electric motors; or instead of limit switches directly acted upon by the tube, it will also be understood by those skilled in the art that the operation may be controlled by the use of photo-electric cells; or changes in the power consumed by the induction coil may be utilized to actuate electrical devices for directly changing the speed of travel of the work.

I have shown my invention applied to progressive, electric induction welding, but it will be understood by those skilled in the art that it may also be used to control the rate of movement of the work when other methods of welding are being employed.

I do not wish to be limited to the specific details of my method and apparatus shown and described herein, but claim as my invention all embodiments thereof coming within the scope of the appended claims.

I claim:

1. In the progressive electric resistance welding of a longitudinal seam in a tubular article, the method of controlling the welding effect at the entering end of said tubular article which consists in feeding the entering end of said tubular article at a relatively slow speed into the zone in which the current flows, increasing the speed at a predetermined, controlled rate of acceleration while the current is flowing in the metal near the entering end of said tubular article and while the welding effect in the entering end of said article is increasing, and maintaining said acceleration during the time required for the welding effect to reach its normal value, said rate of acceleration being such that when the welding effect reaches its normal value, said tubular article has reached a predetermined normal welding speed.

2. In the progressive electric resistance welding of a longitudinal seam in a tubular article by the electric induction method, the method of controlling the welding effect at the trailing end of said tubular article, which consists in feeding the main body portion of said tubular article at the normal speed required for the desired welding effect through the zone in which the heating current is caused to flow in said article, and progressively retarding the speed for a predetermined period when the welding effect in the trailing end of said article is decreasing.

3. In the progressive electric resistance welding of a tubular article, the method of controlling the temperature at or near the ends of the article which consists in feeding the article at a relatively slow speed, causing the speed to start to increase when the entering end of said tubular article passes a predetermined point, increasing the speed to normal speed in a predetermined time, continuing the feeding movement at the normal speed, retarding the speed when the trailing end of said article passes a predetermined point, and continuing the retardation of speed for a predetermined time.

4. In apparatus for progressive electric resistance welding, work-feeding means, welding means, means responsive to the arrival of the entering end of said work in the feeding movement of said work to a predetermined point with respect to said welding means for causing acceleration of said work-feeding means to a predetermined speed in a predetermined time, means responsive to the arrival of the trailing end of said work in the feeding movement of said work to a predetermined point with respect to said welding means to cause retardation of the speed of said work-feeding means to a predetermined reduced speed in a predetermined time, and means for varying said time of acceleration and said time of retardation.

5. In apparatus for the progressive electric resistance welding of a longitudinal seam in tubing by the electric induction method, welding means including induction coil means, means for continuously moving the tubing past said welding means whereby the seam is progressively heated and welded, means responsive to the feeding movement of an end of said tubing past a predetermined point with respect to said welding means for gradually changing the speed of said tube-moving means while the seam near said end is being heated.

6. In apparatus for the progressive electric resistance welding of a seam in a metal article, welding means, means for moving the metal article in a direction parallel to the seam to be welded, means actuated by the movement of a predetermined point on said article past a point fixed in respect to said welding means for changing the speed of travel of said article to a predetermined different speed, and means for varying the length of time required for the operation of said speed-changing means.

7. In apparatus for the progressive electric resistance welding of a seam in a metal article, welding means, means for feeding the metal article past said welding means to progressively weld said seam, means responsive to the feeding movement of said article for changing the speed of said feeding means from one predetermined speed to another predetermined speed, and means for adjustably varying the time required for said speed-changing means to change the speed of said feeding means from said one speed to said other speed.

8. In apparatus for the progressive electric resistance welding of a seam in a metal article, an electric motor for feeding said article through the apparatus, a rheostat connected in an electric circuit of said motor for varying the speed of said motor, a solenoid connected to said rheostat and adapted when energized to move said rheostat in one direction to change the speed of said motor, a limit switch in the path of movement of said article and adapted to be actuated by the feeding movement of a portion of said article past said switch, said limit switch being electrically connected to effect when actuated the energizing and de-energizing of said solenoid, and means adapted to move said rheostat in the other direction when said solenoid is de-energized.

9. The method of progressive electric induction heating or welding in which electric current is induced to flow through the work to heat the work, which consists in moving the work at a relatively faster, normal speed while the heating current is flowing in the main body of the work, and decreasing the speed of the work to a relatively slower speed at a predetermined time when the heating current is flowing in the work near the trailing end of the work at a predetermined distance from said trailing end.

10. In apparatus for the progressive electric resistance welding or heating of a tubular article by the induction method, an internal induction coil having its axis parallel to the axis of said article, means for causing relative traversing movement of said article and said induction coil, and means for automatically causing said relative traversing movement to be slower than normal when an end of said article is passing over said induction coil.

11. In apparatus for the progressive electric resistance welding or heating of a tubular article by the induction method, an internal induction coil adapted to develop when energized a magnetic field, means for causing relative traversing movement of said article and said induction coil whereby said article is linked with said magnetic field, speed-control means for said traversing means, and means actuated by the passage of an end of said article past a predetermined point relative to said induction coil for operating said speed-control means, whereby a change in the heating effect in the subsequently presented portions of said seam near said end may be automatically effected.

12. In apparatus for the progressive electric resistance welding or heating of a tubular article by the induction method, induction coil means adapted to develop when energized a magnetic field, means for causing relative traversing movement of said article and said coil means, whereby said article is linked with said magnetic field, and means for automatically causing said relative traversing movement to be slower than normal when an end of said article is passing through said magnetic field and has attained a definite position relative to said induction coil means.

13. In apparatus for progressive electric resistance welding, work-feeding means, welding means, means responsive to the arrival of the entering end of said work in the feeding movement of said work to a predetermined point with respect to said welding means for causing acceleration of said work-feeding means to a predetermined speed in a predetermined time, while the entering end of said work is being heated, and means for varying said time of acceleration.

14. In apparatus for progressive electric resistance welding, work-feeding means, welding means, means responsive to the arrival of the trailing end of said work in the feeding movement of said work to a predetermined point with respect to said welding means to cause retardation of the speed of said work-feeding means to a predetermined reduced speed in a predetermined time, and means for varying said time of retardation.

FRANK L. SESSIONS.